(12) United States Patent
Lee

(10) Patent No.: US 12,328,019 B2
(45) Date of Patent: Jun. 10, 2025

(54) CYCLIC POWER GENERATION AND STORAGE SYSTEM WITH DYNAMIC BATTERY SWITCHING CAPABILITY

(71) Applicant: LINENG TECHNOLOGY CO., LTD., Hsinchu (TW)

(72) Inventor: Chih-Yu Lee, Hsinchu (TW)

(73) Assignee: LINENG TECHNOLOGY CO., LTD., Hsinchu (TW)

( * ) Notice: Subject to any disclaimer, the term of this patent is extended or adjusted under 35 U.S.C. 154(b) by 216 days.

(21) Appl. No.: 18/223,634

(22) Filed: Jul. 19, 2023

(65) Prior Publication Data

US 2025/0030251 A1    Jan. 23, 2025

(51) Int. Cl.
*H02J 7/00* (2006.01)
*H02P 5/685* (2006.01)

(52) U.S. Cl.
CPC ............ *H02J 7/0024* (2013.01); *H02P 5/685* (2013.01)

(58) Field of Classification Search
CPC .. H02J 7/0063; H02J 3/381; H02J 7/35; H02J 3/32; H02J 7/0045; H01M 50/514; H01M 50/213; H01M 50/264; H01M 50/258; H02P 5/685
See application file for complete search history.

(56) References Cited

FOREIGN PATENT DOCUMENTS

WO    WO-2018205331 A1 *    11/2018    ............ B60L 11/123

* cited by examiner

*Primary Examiner* — Said Bouziane

(57) ABSTRACT

A cyclic power generation and storage system with dynamic battery switching capability is provided, comprising: a power supply modules, a driving module, a transmission module, a plurality of power generation modules, a control module, and a plurality of power storage modules. The present invention can dynamically switch in battery packs to provide a stable power to an electrical device, as well as, switch in a battery or battery pack for recharging with the power generated by the power generation modules. The power storage module having a power management unit, together with the control module, uses the detection result from the power detection unit of the power storage module to dynamically adjust the power generation, distribution, storage, and usage to improve the overall efficiency of the present invention.

14 Claims, 2 Drawing Sheets

CYCLIC POWER GENERATION AND STORAGE SYSTEM WITH DYNAMIC BATTERY SWITCHING CAPABILITY

BACKGROUND OF THE INVENTION

1. Field of the Invention

The present invention relates generally to a power generation and storage system, and more particularly, to a cyclic power generation and storage system with dynamic battery switching capability.

2. The Prior Arts

The stability of power supply has been a great concern for various industrial applications, agricultural sectors, and even households, and hence various power generation and storage systems have been proposed to address the issue.

For example, Taiwan Patent No. 1732480, titled Electric Power Generation Cycle Application Storage System, disclosed a cyclic power generation, application, and storage system wherein a plurality of power generation modules are connected in series through a rod mechanism; the power generation modules are disposed with a plurality of stators, the rod mechanism is disposed with a plurality of rotors on the circumference, and the stators and the rotors are arranged correspondingly. A major feature of the patent is that the stators are arranged in a staggered manner, and the generated power is sent through a control module to a plurality of power storage modules and power consumption applications, as well as to a power supply module to drive a driving module which further drives the rod mechanism to rotate through a transmission module. As such, a cyclic power generation, application, and storage system is formed.

However, as the batteries used in a power storage system do not always charge and discharge at a uniform manner, and thus, the batteries do not stay homogenous or uniform after a period of operation. Specifically, when a battery is low in power while the other batteries in the same battery pack still have power and continue to supply power, which will cause that low battery to stay low and affect its lifespan adversely. On the other hand, in charging, when a battery is already fully charged while the others are still charging, the fully charged battery can also affect lifespan adversely due to overcharging for a long period of time.

In practical usage, the lack of heterogeneous battery management may not be able to reach the optimal performance of a power storage system. As the aforementioned system does not further specify the power storage modules in the disclosed structure, additional enhancement is proposed to address the aforementioned issue.

SUMMARY OF THE INVENTION

A primary objective of the present invention is to provide a cyclic power generation and storage system with dynamic battery switching capability, wherein the power generated by the system can be provided to electrical devices as well as to driving the system to generate further power.

Another objective of the present invention is to provide a cyclic power generation and storage system with dynamic battery switching capability, wherein the power stored and provided to electrical devices can be dynamically managed to improve performance.

To achieve the foregoing objectives, the present invention provides a cyclic power generation and storage system with dynamic battery switching capability is provided, comprising:

a plurality of power generation modules, connected in series through a rod mechanism, the power generation modules being disposed with a plurality of stators, the rod mechanism being disposed with a plurality of rotors on circumference, the stators being arranged in a staggered manner, and the stators and the rotors being arranged correspondingly;

a driving module, having a rotational shaft, and the driving module driving the rotational shaft to rotate;

a transmission module, connected to one end of the rotational shaft, further comprising a first disc and a second disc, the first disc being connected to the rotational shaft and the second disc being connected to the rod mechanism, and the first disc and the second disc being coupled directly or through a linkage element;

a power supply module, for providing power to the driving module;

a control module, respectively connected to the plurality of power generation modules, the power supply module, and the driving module, further comprising: a power switching unit, for switching the transmission path for the power generated by the power generation modules; and a driving speed switching unit, for controlling rotational speed of the driving module;

a plurality of power storage modules, connected to the control module, for storing power generated by the power generation modules; each power storage module further comprising: a plurality of battery packs, each battery pack comprising a plurality of batteries; a power detection unit, for detecting the power in each battery of each battery pack to obtain a detection result of the power storage module; a power connection unit, comprising an output port for connecting and providing power to an electrical device, and an input port for connecting to power switching unit of the control module to receive power generated by the power generation modules; a power management unit, connected to the battery packs, power connection unit, and the power detection unit, for controlling at least one of the battery packs electrically connected to the output port of the power connection unit based on the detection result by the power detection unit and connecting a battery pack to the input port of the power connection unit;

wherein, the power supply module providing power to the driving module to drive the power generation modules through the transmission module to generate power, and the generated power being provided to the power supply module and the power storage modules under the control of the control module.

In a preferred embodiment of the present invention, the control module further comprises a power supply control unit so as to monitor and control the provision of the power to the power supply module.

In a preferred embodiment of the present invention, the detection result by the power detection unit at least comprises a remaining power in each battery and each battery pack of each power storage module and a total remaining power of each power storage module.

In a preferred embodiment of the present embodiment, the transmission module further comprises a linkage element and the linkage element is a belt.

In a preferred embodiment of the present embodiment, the transmission module further comprises a linkage element and the linkage element is a chain.

In a preferred embodiment of the present invention, when the total remaining power in the battery pack providing power to the output port of the power connection unit is below a preset first threshold, the power management unit switches in another battery pack to be electrically connected to the output port of the power connection unit.

In a preferred embodiment of the present invention, when the remaining power in one battery of the battery pack providing power to the output port of the power connection unit is below a preset first threshold, the power management unit switches in another battery pack to be electrically connected to the output port of the power connection unit.

In a preferred embodiment of the present invention, the preset first threshold is one of a fixed value or a function of the detection result.

In a preferred embodiment of the present invention, the power management unit controls the switched out battery pack to be connected to the input port of the power connection unit for recharging.

In a preferred embodiment of the present invention, when the remaining power in a battery in the battery connected power to the input port of the power connection unit is above a preset second threshold, the power management unit switches another battery in the same battery pack to be electrically connected to the input port of the power connection unit.

In a preferred embodiment of the present invention, when the remaining power in a battery in the battery pack connected to the input port of the power connection unit is above a preset second threshold, the power management unit switches a battery with the lowest remaining power in the same battery pack to be electrically connected to the input port of the power connection unit.

In a preferred embodiment of the present invention, when the remaining power in a battery in the battery pack connected to the input port of the power connection unit is above a preset second threshold, the power management unit switches a battery with the lowest remaining power among the battery packs to be electrically connected to the input port of the power connection unit.

In a preferred embodiment of the present invention, when the remaining power in a battery in the battery pack connected to the input port of the power connection unit is above a preset second threshold, the power management unit switches a battery with the lowest remaining power among the battery pack with the lowest total remaining power to be electrically connected to the input port of the power connection unit.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
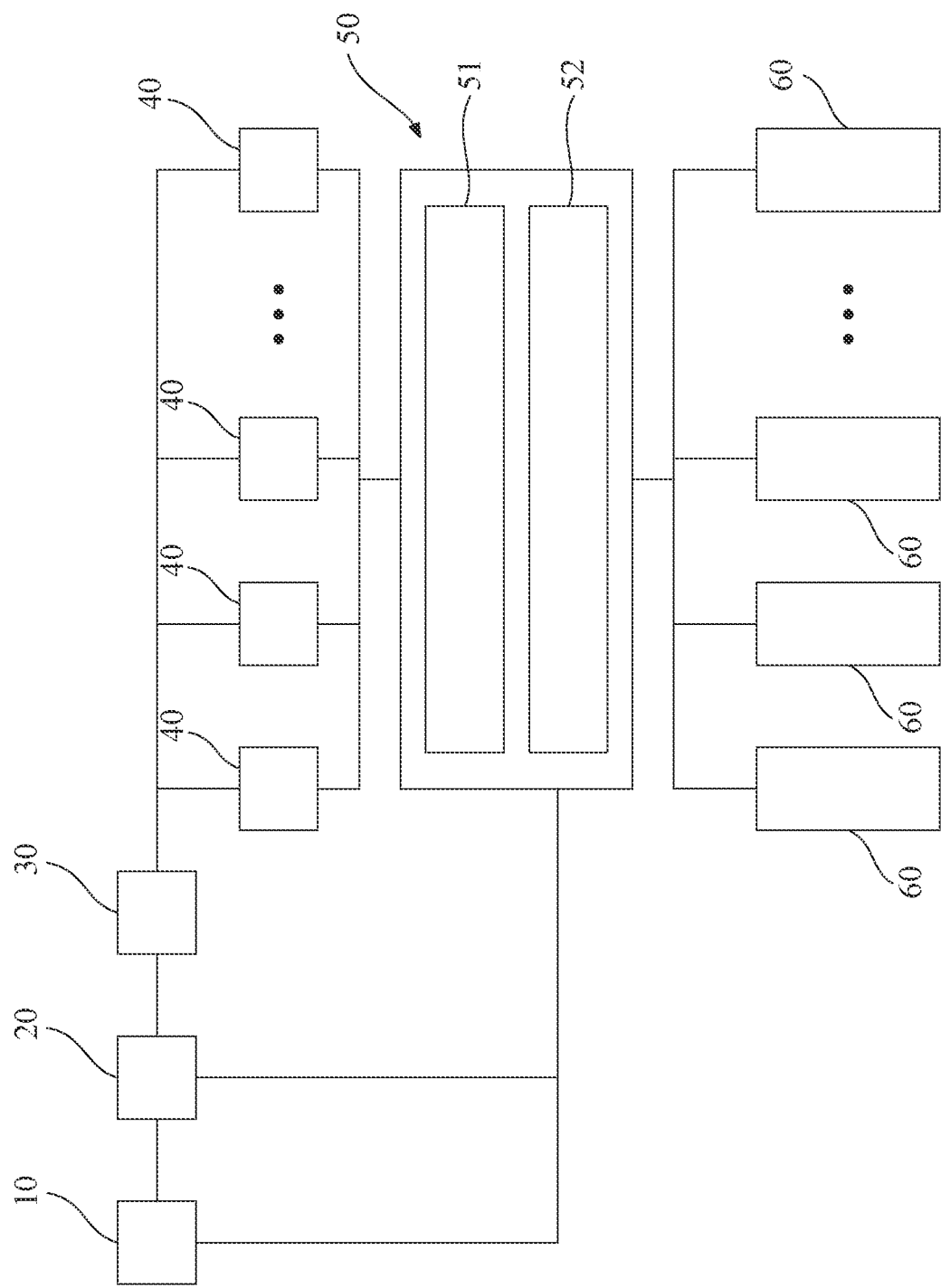
FIG. 1 is a schematic view of a cyclic power generation and storage system with dynamic battery switching capability of the present invention.

Refer to FIG. 1, which is a schematic view of a cyclic power generation and storage system with dynamic battery switching capability, comprising: a power supply modules 10, a driving module 20, a transmission module 30, a plurality of power generation modules 40, a control module 50, and a plurality of power storage modules 60.

The power supply module 10 is to provide power to the driving module 20. The power supply module 10 of the present invention can be a battery, such as, Ni—Cd battery, Ni-MH battery, Li-ion battery, SMF battery, CMF battery, and so on, but not limited thereto. The power supply module 10 is also connected to the control module 50 to receive power generated by the power generation modules 40 in case that the power in the power supply module 10 becomes low.

The driving module 20 is disposed with a rotational shaft, and the driving module 20 drives the rotational shaft to rotate so that the transmission module 30 connected to one end of the rotational shaft will also be activated. The driving module 20 is connected to the control module 50 so that the rotational speed of the driving module 20 can be adjusted by the control module 50.

The transmission module 30 of the present embodiment further comprises a first disc and a second disc, the first disc is connected to the rotational shaft and the second disc is connected to a rod mechanism, and the first disc and the second disc are directly coupled with each other or through a linkage element. For example, the transmission module 30 comprises two gears engaged with each other. Alternatively, a linkage element, such as a belt or a chain, may be used to connect the first disc to the second disc. As such, when the rotational shaft is driven by the driving module 20 to rotate the first disc will also rotate, and thought the linkage element, the second disc will rotate in turn to drive the rod mechanism to rotate, wherein the rod mechanism is used to connect the plurality of power generation module 40 in series. The transmission However, it should be noted that the embodiment of the transmission module 30 is not limited to the present embodiment. Other mechanisms able to perform similar function can also be used.

As aforementioned, the plurality of power generation modules 40 is connected in series through the rod mechanism. Specifically, the power generation modules are disposed with a plurality of stators, the rod mechanism is disposed with a plurality of rotors on circumference, the stators are arranged in a staggered manner, and the stators and the rotors are arranged correspondingly. As such, when the rod mechanism rotates, the rotors on the rod mechanism and the stators of the power generation modules will rotate with respect to each other to generate power.

The control module 50 is respectively connected to the plurality of power generation modules 40, the power supply module 10, and the driving module 20, and further comprises: a power switching unit 51, for switching the transmission path for the power generated by the power generation modules 40; and a driving speed switching unit 52, for controlling rotational speed of the driving module 20. It should be noted that the control module 50 may also comprise an additional power supply control unit so as to monitor and control the provision of the power to the power supply module 10.

Figure 2:
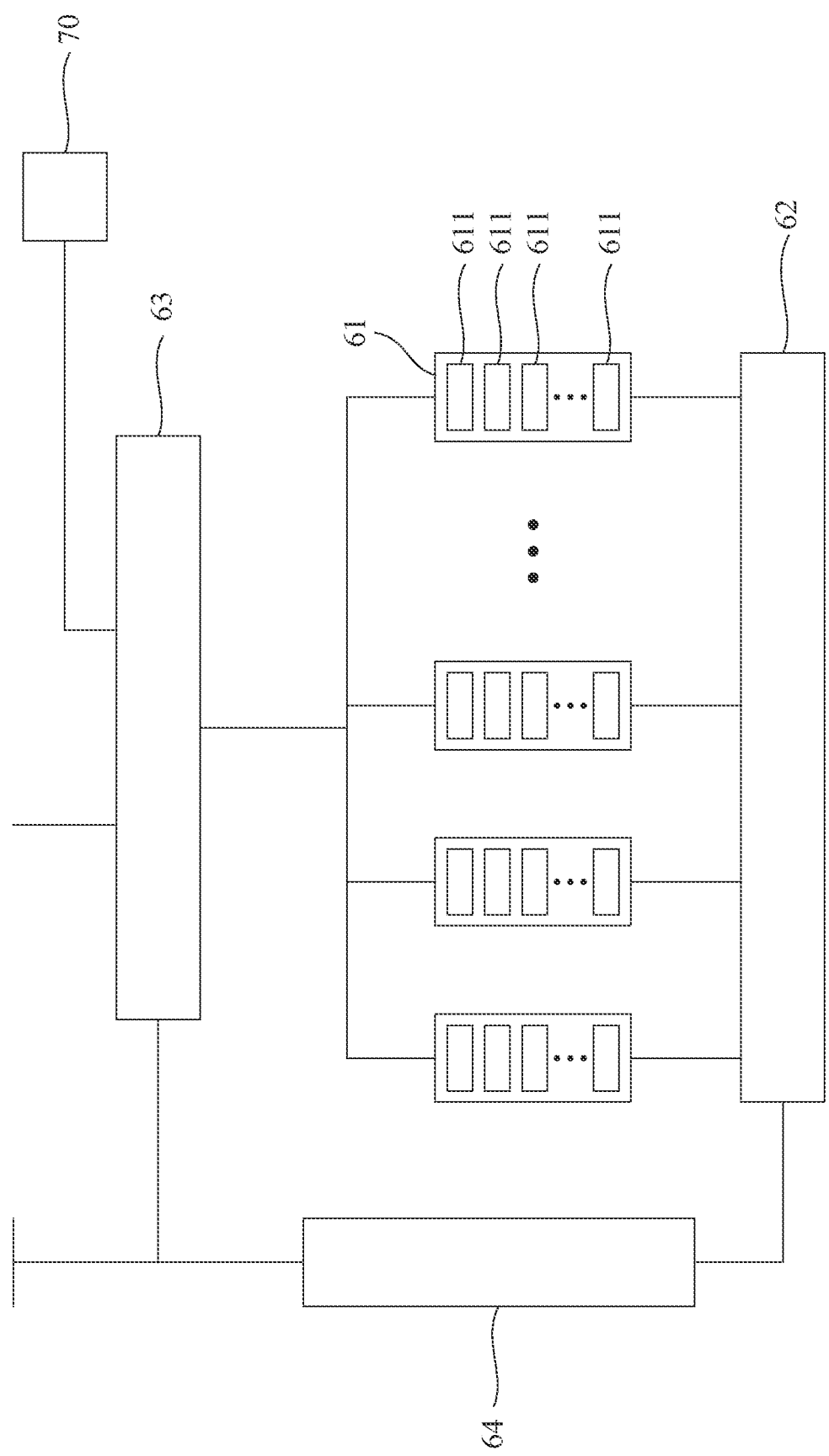
FIG. 2 is a schematic view of a power storage module according to an embodiment of the present invention.

Referring to FIG. 2, FIG. 2 is a detailed view of the structure of the power storage module according to an embodiment of the present invention. The plurality of power storage modules 60 is connected to the control module 50, for storing power generated by the power generation modules 40. Specifically, each power storage module further comprises: a plurality of battery packs 61, each battery pack 61 comprises a plurality of batteries 611; a power detection unit 62, for detecting the power in each battery 611 of each battery pack 61 to obtain a detection result of the power storage module 60; a power connection unit 63, comprising an output port for connecting and providing power to an electrical device 70, and an input port for connecting to power switching unit 52 of the control module 50 to receive power generated by the power generation modules 50; a power management unit 64, connected to the battery packs 61, the power detection unit 62, and power connection unit 63, for controlling at least one of the battery packs 61 electrically connected to the output port of the power connection unit 63 based on the detection result by the power detection unit 62 and connecting a battery pack 61 to the input port of the connection unit 63.

As such, the operation of the cyclic power generation and storage system with dynamic battery switching capability of the present invention is as follows: the power supply module 10 provides power to the driving module 20 to drive, via the transmission module 30, the power generation modules 40 to generate power, and the generated power is provided to the power supply module 10 and the power storage modules 60 under the control of the control module 50.

It should be further noted that the detection result by the power detection unit 62 at least comprises a remaining power in each battery 611 and the battery pack 61 of each power storage module 60 and a total remaining power of each power storage module. As such, the power management unit 64 can manage and switch in and out individual battery or battery pack more effectively to meet the power provision requirement of the electrical device. More specifically, when a battery 611 or a battery pack 61 currently providing power to the electrical device is low in power, the battery 611 or the battery pack 61 will be switched out while a battery 611 or a battery pack 61 with a higher remaining power will be switched in.

Moreover, when a battery 611 or a battery pack 61 currently recharging with power from the power generation modules 40 is full or high in power, the battery 611 or the battery pack 61 will be switched out while a battery 611 or a battery pack 61 with a low remaining power will be switched in for recharging.

For example, when the total remaining power in the battery pack 61 providing power to the output port of the power connection unit 63 is below a preset first threshold, the power management unit 64 switches another battery pack 61 in to be electrically connected to the output port of the power connection unit 63. However, the present invention is not limited thereto. In other embodiment, the switching out may occur when a battery 611 in the battery pack 61 providing power to the output port of the power connection unit 63 is detected to be below the preset first threshold, the power management unit 64 switches in another battery pack 61 to be electrically connected to the output port of the power connection unit.

Similarly, the power management unit 64 controls the switched out battery pack to be connected to the input port of the power connection unit 63 for recharging.

In a preferred embodiment of the present invention, when the remaining power in a battery 611 in the battery pack 61 connected to the input port of the power connection unit 63 is above a preset second threshold, the power management unit 64 switches another battery in the same battery pack to be electrically connected to the input port of the power connection unit 63.

Alternatively, in other embodiments of the present invention, when the remaining power in a battery 611 in the battery pack 61 connected to the input port of the power connection unit 63 is above a preset second threshold, the power management unit 64 switches in a battery 611 with the lowest remaining power in the same battery pack 61 to be electrically connected to the input port of the power connection unit 63.

In yet another embodiment, when the remaining power in a battery 611 in the battery pack 61 connected to the input port of the power connection unit 63 is above a preset second threshold, the power management unit 64 switches in a battery 611 with the lowest remaining power among the battery packs 61 to be electrically connected to the input port of the power connection unit 63; or, when the remaining power in a battery 611 in the battery pack 61 connected to the input port of the power connection unit 63 is above a preset second threshold, the power management unit 64 switches in a battery 611 with the lowest remaining power among the battery pack 61 with the lowest total remaining power to be electrically connected to the input port of the power connection unit 63.

It should also be noted that the power management unit 64 also communicates with the power switching unit 51 of the control module, so that the control module can determine the power generated by which power generation module 40 should be switch to which power storage module 60 for recharging.

In a preferred embodiment of the present invention, the preset first threshold and the second threshold can be a fixed value or a function of the detection result. For example, in a preferred embodiment of the present invention, the first threshold may be 20% of the maximum power in a battery or a battery pack. The second threshold may be 100% or 80% of the maximum power in a battery or a battery pack, depending on the actual application. Similarly, the first threshold and the second threshold may be calculated through a function of the detection result, such as, the average of the total remaining power of all battery packs, or a difference between the remaining power of two batteries or two battery packs, and so on. The present invention is not limited thereto.

In summary, the cyclic power generation and storage system with dynamic battery switching capability of the present invention can dynamically switch in battery packs to provide a stable power to an electrical device, as well as, switch in a battery or battery pack for recharging with the power generated by the power generation modules. The power management unit of the power storage module, together with the control module, uses the detection result from the power detection unit to dynamically adjust the power generation, distribution, storage, and usage to improve the overall efficiency of the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A cyclic power generation and storage system with dynamic battery switching capability, comprising:
   a plurality of power generation modules, connected in series through a rod mechanism, the power generation modules being disposed with a plurality of stators, the rod mechanism being disposed with a plurality of rotors on circumference, the stators being arranged in a staggered manner, and the stators and the rotors being arranged correspondingly;

a driving module, having a rotational shaft, and the driving module driving the rotational shaft to rotate;

a transmission module, connected to one end of the rotational shaft, further comprising a first disc and a second disc, the first disc being connected to the rotational shaft and the second disc being connected to the rod mechanism, and the first disc and the second disc being coupled directly or through a linkage element;

a power supply module, for providing power to the driving module;

a control module, respectively connected to the plurality of power generation modules, the power supply module, and the driving module, further comprising: a power switching unit, for switching the transmission path for the power generated by the power generation modules; and a driving speed switching unit, for controlling rotational speed of the driving module; and a plurality of power storage modules, connected to the control module, for storing power generated by the power generation modules; each power storage module further comprising:

a plurality of battery packs, each battery pack comprising a plurality of batteries;

a power detection unit, for detecting the power in each battery of each battery pack to obtain a detection result of the power storage module;

a power connection unit, comprising an output port for connecting and providing power to an electrical device, and an input port for connecting to power switching unit of the control module to receive power generated by the power generation modules; and a power management unit, connected to the battery packs, power connection unit, and the power detection unit, for controlling at least one of the battery packs electrically connected to the output port of the power connection unit based on the detection result by the power detection unit and connecting a battery pack to the input port of the power connection unit;

wherein, the power supply module providing power to the driving module to drive the power generation modules through the transmission module to generate power, and the generated power being provided to the power supply module and the power storage modules under the control of the control module.

2. The cyclic power generation and storage system with dynamic battery switching capability according to claim 1, wherein the control module further comprises a power supply control unit so as to monitor and control the provision of the power to the power supply module.

3. The cyclic power generation and storage system with dynamic battery switching capability according to claim 1, wherein the detection result by the power detection unit at least comprises a remaining power in each battery and each battery pack of each power storage module and a total remaining power of each power storage module.

4. The cyclic power generation and storage system with dynamic battery switching capability according to claim 1, wherein when the total remaining power in the battery pack providing power to the output port of the power connection unit is below a preset first threshold, the power management unit switches in another battery pack to be electrically connected to the output port of the power connection unit.

5. The cyclic power generation and storage system with dynamic battery switching capability according to claim 4, wherein when the remaining power in one battery of the battery pack providing power to the output port of the power connection unit is below a preset first threshold, the power management unit switches in another battery pack to be electrically connected to the output port of the power connection unit.

6. The cyclic power generation and storage system with dynamic battery switching capability according to claim 5, wherein the preset first threshold is one of a fixed value or a function of the detection result.

7. The cyclic power generation and storage system with dynamic battery switching capability according to claim 1, wherein the power management unit controls the switched out battery pack to be connected to the input port of the power connection unit for recharging.

8. The cyclic power generation and storage system with dynamic battery switching capability according to claim 7, wherein when the remaining power in a battery in the battery connected power to the input port of the power connection unit is above a preset second threshold, the power management unit switches another battery in the same battery pack to be electrically connected to the input port of the power connection unit.

9. The cyclic power generation and storage system with dynamic battery switching capability according to claim 8, wherein the preset second threshold is one of a fixed value or a function of the detection result.

10. The cyclic power generation and storage system with dynamic battery switching capability according to claim 7, wherein when the remaining power in a battery in the battery pack connected to the input port of the power connection unit is above a preset second threshold, the power management unit switches a battery with the lowest remaining power in the same battery pack to be electrically connected to the input port of the power connection unit.

11. The cyclic power generation and storage system with dynamic battery switching capability according to claim 7, wherein when the remaining power in a battery in the battery pack connected to the input port of the power connection unit is above a preset second threshold, the power management unit switches a battery with the lowest remaining power among the battery packs to be electrically connected to the input port of the power connection unit.

12. The cyclic power generation and storage system with dynamic battery switching capability according to claim 7, wherein when the remaining power in a battery in the battery pack connected to the input port of the power connection unit is above a preset second threshold, the power management unit switches a battery with the lowest remaining power among the battery pack with the lowest total remaining power to be electrically connected to the input port of the power connection unit.

13. The cyclic power generation and storage system with dynamic battery switching capability according to claim 1, wherein the transmission module further comprises a linkage element and the linkage element is a belt.

14. The cyclic power generation and storage system with dynamic battery switching capability according to claim 1, wherein the transmission module further comprises a linkage element and the linkage element is a chain.

* * * * *